US006346196B1

(12) United States Patent
Bose

(10) Patent No.: US 6,346,196 B1
(45) Date of Patent: Feb. 12, 2002

(54) FLOW-THROUGH, HYBRID MAGNETIC FIELD GRADIENT, ROTATING WALL DEVICE FOR ENHANCED COLLOIDAL MAGNETIC AFFINITY SEPARATIONS

(75) Inventor: Arijit Bose, Lexington, MA (US)

(73) Assignee: The Board of Governors for Higher Education State of Rhode Island Providence Plantations, Providence, RI (US)

( * ) Notice: Subject to any disclaimer, the term of this patent is extended or adjusted under 35 U.S.C. 154(b) by 0 days.

(21) Appl. No.: 09/720,608

(22) PCT Filed: Jul. 1, 1999

(86) PCT No.: PCT/US99/14962

§ 371 Date: Mar. 13, 2001

§ 102(e) Date: Mar. 13, 2001

(87) PCT Pub. No.: WO00/01462

PCT Pub. Date: Jan. 13, 2000

Related U.S. Application Data

(60) Provisional application No. 60/091,354, filed on Jul. 1, 1998.

(51) Int. Cl.[7] .................................... B01D 35/06

(52) U.S. Cl. ....................... 210/695; 210/222; 209/214; 209/223.1; 209/225; 435/7.5; 435/173.9; 435/261; 436/526

(58) Field of Search .............................. 209/214, 223.1, 209/225; 210/222, 695; 435/7.51, 173.9, 261; 436/526

(56) References Cited

U.S. PATENT DOCUMENTS

| | | | |
|---|---|---|---|
| 5,336,760 | A | 8/1994 | Hardwick et al. |
| 5,567,326 | A | 10/1996 | Ekenberg et al. |
| 5,622,831 | A | 4/1997 | Liberti et al. |
| 5,641,622 | A | 6/1997 | Lake et al. |

*Primary Examiner*—David A. Reifsnyder
(74) *Attorney, Agent, or Firm*—Samuels, Gauthier & Stevens

(57) ABSTRACT

A slowly rotating separation chamber with an oscillating axial magnetic field gradient created by an alternating current solenoid superimposed on a steady radial gradient in a horizontal chamber is used as part of a flow-through multiunit colloidal magnetic affinity separation device including magnets. The field-gradient induced microscale particle motion, as well as particle resuspension by chamber rotation, significantly enhances particle-target contact without generating damaging shear forces. Chamber rotation also minimizes sedimentation of non-neutrally buoyant magnetic particles. The alternating current solenoid are a series of coils arranged along the axial flow direction, a single chamber is utilized as a flow-through multistage separation device, leading to a major increase in volume and reduced "down" times as compared to batch equipment.

20 Claims, 7 Drawing Sheets

FLOW-THROUGH, HYBRID MAGNETIC FIELD GRADIENT, ROTATING WALL DEVICE FOR ENHANCED COLLOIDAL MAGNETIC AFFINITY SEPARATIONS

This application claims benefit of provisional application 60/091,354, filed Jul. 1, 1998. This application is a 3.71 of PCT/US98/14962, filed Jul. 1, 1999.

BACKGROUND OF THE INVENTION

Inexpensive, gentle, highly specific, robust, and rapid techniques are required for the separation and isolation of macromolecules and whole cells from complex mixtures. The most prevalent separation techniques include filtration, centrifugation, extraction, adsorption, chromatography, precipitation, electrophoresis, isopycnic sedimentation, and isokinetic gradients. The type of separation technique suitable for a system depends on the nature of biological molecule and complexity of the media from which it is to be isolated. All of these bioseparation techniques rely on the physical (size, density, shape) or chemical (charge, solubility) differences between biological macromolecules to effect the separation. In many biological mixtures, the physical and chemical characteristics of the species to be separated are often very similar. In addition, currently existing procedures for isolations of biological molecules cause considerable shear-induced damage to the target, especially, in bioassays that require several rinse steps, Pretlow, T. G., Pretlow, T. P., Cell Separation—Methods and Selected Applications, Academic Press, New York, 1–5 (1982–1987).

Techniques that rely on specific chemical linkages (affinity purification) rather than physical differences open up the possibilities for isolation of macromolecules that are difficult to separate using other methods. In colloidal magnetic affinity separation schemes, the substrate consists of magnetic particles distributed uniformly throughout the mixture-containing solution, enhancing the probability of substrate-target contact. Highly specific linkages between the ligand-coated superparamagnetic particles and target materials (with surface ligates) are used to preferentially magnetize the targets. Steady magnetic field gradients are then employed to immobilize and isolate these targets. Current use of magnetic particles for cell separations, Hancock J. P., Kemshead, J. T., Journal Immunological. Methods, 164 51 (1993); Jacobs, n., Moutschen, M. P., Boniver, J., Greimers, R., Schaaf-Lafontaine, N., Res. Immunology, 144, 141 (1993); Funderud, S., Erikstein, B., Asheim, H. C., Nustad, K., Stokke, T., Blomhoff, H. K., Holte, H., Smeland, B., Eur. J. Immunnol., 20, 201 (1993); Schmitt, D. A., Hanau, D., Cazenave, J. P., J. Immunogenet., 16, 157 (1989); Aardingham, J. E., Kotasek, D., Farmer, B., Butler, R. N., Mi, J. X., Sage, R. E., Dobrovic, A., Cancer Research, 53, 3455, (1993); Kvalheim, G., Fjeld, J. G., Pil, A., Funderud, S., Ugelstad, J., Fodstad, O., Nustad, K., Bone Marrow Transpolant, 4, 567, (1989); Skjonsberg, C., Kill Blomhoff, H., Gaudernack, G., Funderud, S., Beiske, K., Smeland, E. B., Scand. J. Immunology, 31, 567, (1990); Drancourt, M., George, F., Brouque, P., Sampol, J., Raoult, D., Journal Clinical Microbiology, 30, 2118 (1992); Dairkee, S., Heid, H. W., In Vitro Cell Dev. Biol., 29A, 427, (1993); Tanaka H., Ishida, Y., Kaneko, T., Matsumoto, N., Br. J. Haematol, 73, 18, (1989); Cottler-Fox, M., Bazar, L. S., Deeg, H. J., Prog. Clin. Biol. Res., 333, 277, (1990); Brinchmann, J. E., Gaudernack, G., Thorssy, E., Jonassen, T. O., Vartdal, F., J. Virol. Methods, 25, 293, (1989); Kemshead, J. T., Elsom, G., Patel, K., Prog. Clin. Biol. Res., 333, 235 (1990); and Belter, P. A., Cussler, E. L., Hu, W. S., Bioseparations: Downstream processing for biotechnology, John Wiley and sons, New York, (1988); for other biological macromolecules; Nunez, L., Kaminski, M. D., American Chemical Society: Chemtech, 41, (1988); and for metals; Sonti, S. V., Ph. D. Thesis, University of Rhode Island, (1995) have been reviewed extensively. Surfaces of particles containing magnetic cores can be derivatized with a large repertoire of functional groups, making this idea potentially feasible for many unexplored applications.

However, several important limitations of currently available technology have restricted the applicability of colloidal magnetic separation. These include inadequate specificity (often caused by diffusion-limited attachment of targets to the magnetic particles—larger targets in a suspension arrive at the affinity surface slower than the smaller, non-target macromolecules) and the long time necessary to achieve the required degree of separation if target viability has to be maintained (agitation results in damaging shear forces). Because magnetic particles have specific gravities that are significantly larger than water or aqueous salt solutions, they have a tendency to sediment, and must be kept suspended by Brownian motion. This severely restricts their size, and, because the magnetic susceptibility scales with particle volume, requires use of high magnetic field gradients to mobilize them through the surrounding liquid phase. Furthermore, most existing devices operate in the batch mode. This limits throughput and leads to large amounts of down time. The economics of this procedure have made it useful only for very high value products and processes such as cell sorting, DNA purification, protein capture, and microorganism isolation; Haukanes, B. I., Kvam, Bio/Technology, 11, 60, 1993); and Olsvik, O., Popovic, T., Skjerve, E., Cudjoe, K., Hornes, E., Ugelstad, J., Uhlen, M., Clin. Micr. Rev., 7, 43, (1994). Technological advances that speed up this process while simultaneously enhancing target specificity can make a significant impact to this burgeoning area.

We have discovered a new flow-through, multiunit device that potentially removes many of these limitations, resulting in high specificity and reduced separation time.

SUMMARY OF THE INVENTION

Broadly the invention is a device (system) and method for the magnetic separation of target particles (macromolecules) from a mixture. Biotin is bound to a target particle. Magnetics beads labeled with avidin or streptlavidin are mixed with the target particles. The avidin or streptlavidin binds to the biotin and the bound complex is magnetically separated from the mixture.

The invention embodies a flow-through multi magnetic-unit device comprising a slowly rotating horizontal chamber designed for a colloidal magnetic affinity separation process. Each magnetic unit consists of an alternating current carrying solenoid surrounding the chamber, and a pair of permanent magnets located downstream from the solenoid, that rotate with the chamber. The chamber rotation simulates a low gravity environment, severely attenuating any sedimentation of non-neutrally buoyant magnetic particles as well as feed, thus promoting good particle-target contact throughout the chamber volume. The oscillating magnetic field gradient produced by the solenoid introduces translational and rotary microparticle oscillations, enhancing mixing, while the permanent magnets immobilize the targets on the chamber walls.

The preferred embodiment is described with a feed system comprising ~50% mixture of biotinylated latex beads (target) and non-functionalized latex beads (non-target) to support that the target particles can be captured and separated from the non-target particles. A maximum separation capture efficiency of 60% and a separation factor of ~18.28 with purity as high as 95% has been achieved.

SEPARATION DEVICE DESCRIPTION

Figure 1:
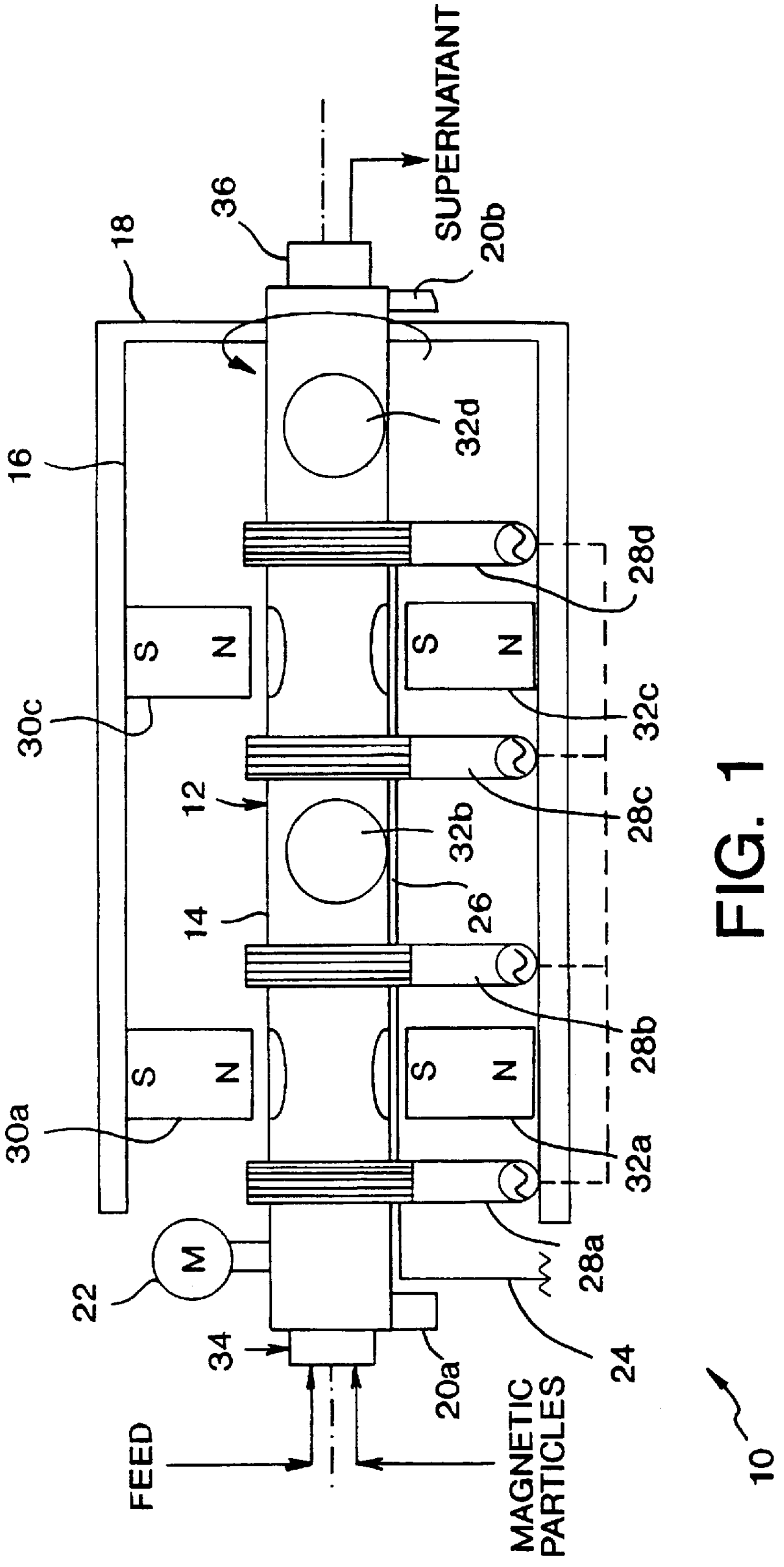
FIG. 1 is a schematic representation of a device embodying the invention.

A separation device 10 embodying the invention is shown schematically in FIG. 1 and comprises a chamber 12 having a wall 14. Secured to the wall 14, for rotation therewith is a sleeve 16, having an end wall 18, secured to the sleeve 16. The wall 14 is rotatably supported on bearing blocks 20*a* and 20*b*. A motor 22 rotates (drives) the wall 14, and thereby the chamber 12 and the sleeve 16, by any suitable means, belt driven, gear driven, etc. A holder 24, supports a rod 26, which rod 26 passed through the open end of the sleeve 16. Four repeating units are defined in the chamber 12. Each unit comprises an alternating current solenoid 28*a*–28*d*, followed by two azimuthally distributed permanent magnets, 30*a*–30*d* and 32*a*–32*d* respectively. Magnets 30*b* and 30*d* are not shown. Magnet pairs 30*a*/32*a*; 30*b*/32*b*; 30*c*/32*c* and 30*d*/32*d* are offset 90° from one another. The magnets 30/32 are secured to the sleeve 16 and rotate with the chamber 12. The solenoids 28, fixed to the rod 26, do not rotate. The chamber 12 rotates within the copper wire of the solenoid 28.

The slow rotation of the chamber 12 mimics a low gravity environment without introducing centrifugal forces and removes sedimentation of non-neutrally buoyant particles. Separate peristaltic pumps (not shown) drive a feed mixture (containing target particles) and magnetic particles through a rotary coupler 34 (Deublin Inc.) into one (upstream) end of the chamber. A second rotary 36 coupler at the other (downstream) end of the chamber 12 allows the flow of supernatant into a collection vessel (not shown).

Figure 2:
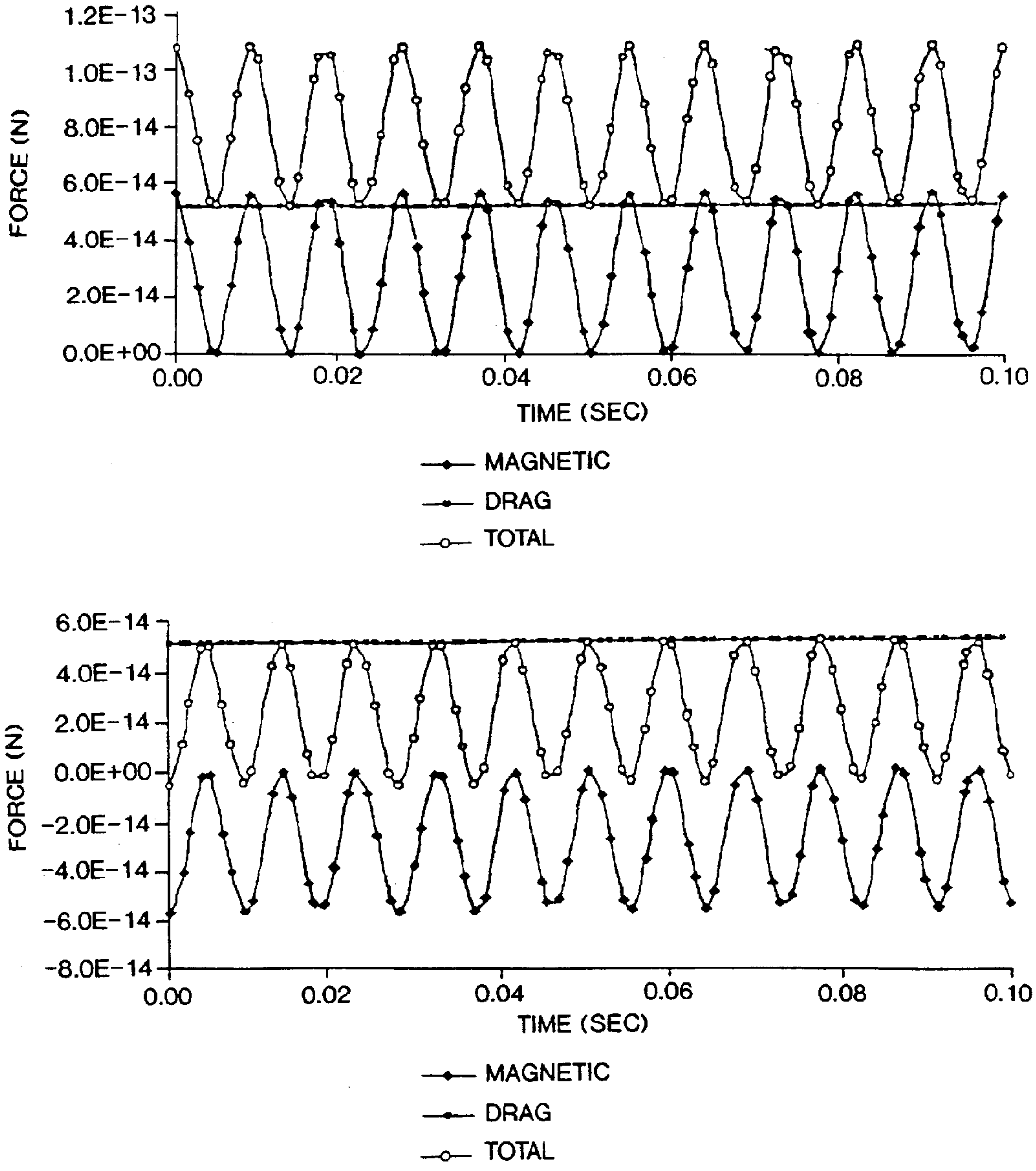
FIG. 2 is graphs of calculated horizontal forces for a magnetic particle located exactly at either end of a solenoid and along the axis of the chamber.
Figure 3:
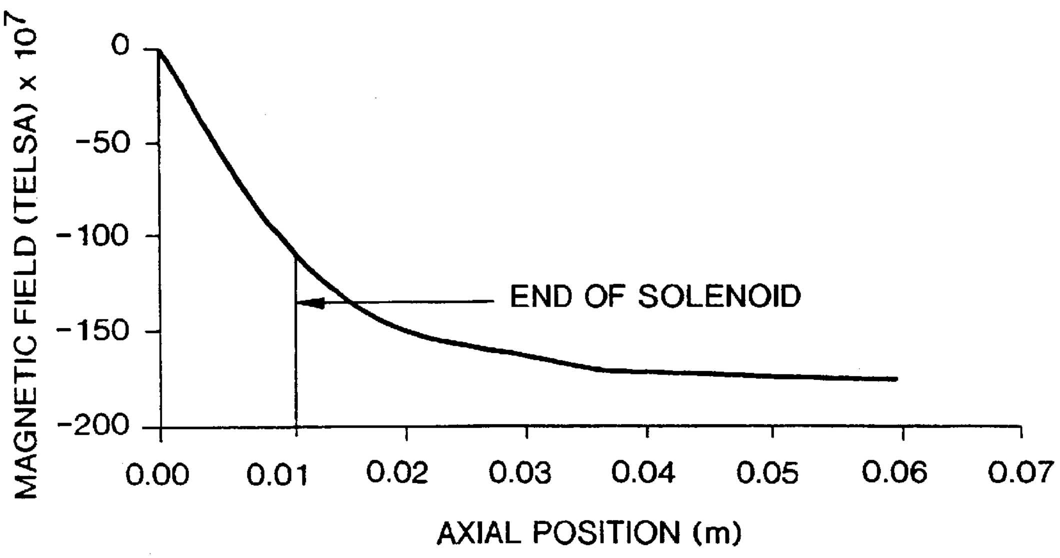
FIG. 3 is a graph of magnetic field versus axial position in the solenoid.

As the particles and feed flow into the chamber 12, they are acted upon by the magnetic field gradients produced by the solenoids 28. Each solenoid 28 has 14 turns of copper wire over a length of 2.5 cm, and carries a maximum current of 10 amps at a frequency of 60 Hz. For a particle located to the left of a solenoid 28, the axial component of the magnetic force varies in magnitude as the current changes but points in the same direction as the base flow. These results in a time-varying translational motion in the axial direction, superimposed on the particle motion created by liquid flow, as shown in FIG. 2. As the particle moves past the center of the solenoid, the direction of the time-varying axial magnetic field gradient reverses and now points opposite to the base flow direction. The drag force remains constant. In addition, the time varying magnetic field induces an oscillating torque on each particle. Because the length/diameter ratio of the solenoid is ~1, fringing effects dominate and no location within the solenoid has a uniform axial magnetic field, as shown in FIG. 3. This minimizes magnetically 'dead' regions within the separation chamber. As the particle moves past the center of the solenoid, the direction of the time-varying axial magnetic field gradient reverses and now points opposite to the base flow direction. The drag force and the axial magnetic force created by the solenoid are now in opposite directions, causing particle translational oscillation.

Figure 4:
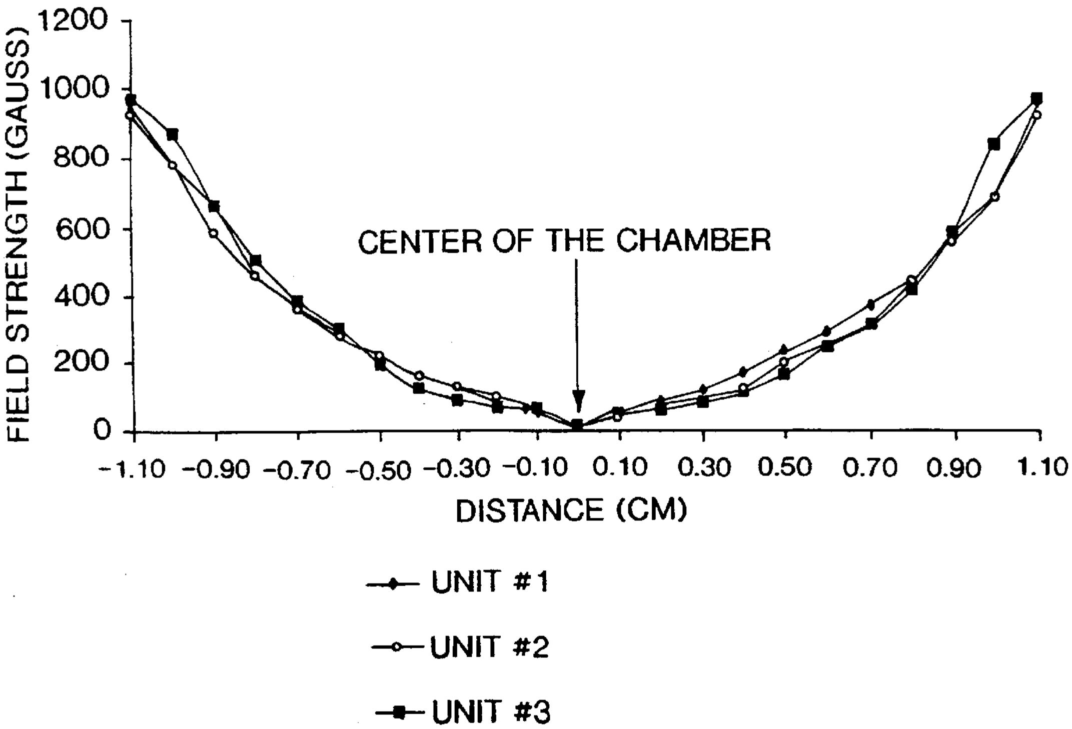
FIG. 4 is a graph of the field gradient ahead of the permanent magnets of each unit.

Four pairs 30/32 of 0.1 Tesla Al—Ni—Co magnets are distributed azimuthally around the chamber 12 at a distance of 2.0 cm from the end of each of the solenoids, and rotated along with the tube at 25 rpm. Each pair consists of magnets at diametrically opposite ends, the second pair is located 1.0 cm downstream from the first, and positioned at 90° to the first. In the absence of any magnetic forces, the residence time for particles in the chamber for the flow rates used is of the order of a few minutes. The permanent magnet strength must be high enough to permit target particles to move towards the chamber wall in a time that is short compared to the residence time. A force of $\sim 1.6 \times 10^{-7}$ dynes is needed to move a 1.0 $\mu$m particle at a radial velocity of 0.1 cm/sec (this would mean 10 sec for a particle at the axis to reach the wall) through a liquid of water-like viscosity (1.0 cP). If a 2.8 $\mu$m diameter ferrite magnetic particle is coupled to this target, the magnetic field gradient required to create this force is ~0.5 Kgauss/cm. FIG. 4 shows the experimentally measured field gradient (101 B Gauss Meter, LDT Electronics, Inc.), ahead of the permanent magnet, and demonstrates the permanent magnets used are strong enough to move the particles to the wall within the required time. The permanent magnets faced one another at a distance of 2.2 cm.

Experimental Procedure

The device 10 incorporates a 2.0 cm internal diameter axially rotating horizontal chamber 12, with four repeating units 28/30/32. Each unit consisted of a stationary alternating current solenoid 28 surrounding the chamber 12 followed by two azimuthally distributed permanent magnets 30/32 that rotated with the chamber. Experiments were carried out on a model feed system consisting of a ~50% mixture of biotinylated latex beads of diameter 1.0 $\mu$m (target material) and non-functionalized latex beads of diameter 9.7 $\mu$m (non-target material). Streptavidin labeled magnetic particles (2.8 $\mu$m diameter) were used as the separation vehicles. The number concentration of streptavidin beads was $\sim 3 \times 10^{6}$beads/ml. Samples were processed at two different feed flow rates, 12 ml/min and 35 ml/min. The lower flow rate allowed for better capture of the target material. For those conditions, we achieved a maximum separation efficiency 60%, and separation factor of ~18.0 with 95% purity from these conditions. This flow-through multiunit separation device can lead to a large increase in processing volume and reduced 'down' time compared to current batch equipment, without any loss in specificity and purity, potentially opening up magnetic colloidal separations for large scale applications.

M-280 (2.8 μm diameter) streptavidin coated magnetic beads were obtained from Dynal Inc. The biotin labeled polystyrene beads were obtained from Sigma Chemical Company and the microparticles are negative charge-stabilized colloidal particles. The non-functionalized latex beads were purchased from Interfacial Dynamics Corporation. Single distilled water was passed through a four cartridge Millipore "Mill Q" system until its resistivity reached 18 Megaohms-cm. This water was used for preparing all the suspensions.

The streptavidin beads were used at a particle number concentration of ~$3\times10^6$ beads/ml. The particle concentrations were measured in a hemocytometer mounted on a Nikon optical microscope. The feed consisted of 1.0 μm diameter biotinylated latex beads mixed in a 1:1 number ratio with 9.7 μm diameter non-functionalized latex beads at an overall particle number concentration of ~$6\times10^4$/ml. 100 ml of the Dynal beads and an equal volume of a sample containing the target and non-target material were fed simultaneously at the flow rates specified below. The biotinylated particles are significantly different in size from the non-functionalized latex particles, so that they can be easily distinguished using optical microscopy.

The number target particles in the feed and in the supernatant are calculated by multiplying the total feed and supernatant volumes by the particle number concentrations. The particle capture efficiency, η, is evaluated using:

$$\eta=(N_f-N_s)/N_f$$

where $N_f$ and $N_s$ are the number of target particles in the feed and supernatant respectively.

After collecting the supernatant from the tube end for the duration of the experiment, the flow of the feed and magnetic particle suspensions was interrupted. The permanent magnets are removed, and buffer solution is allowed to flow through the chamber. The magnetic particle/target complexes that had been immobilized at the chamber walls were now resuspended into the chamber, and driven out from the other end by the bulk flow. The magnetic particle rich solution collected in this way is designated as the suspension from the pole region. The suspension from the pole regions is examined in hemocytometer. The separation factor, β, is defined as:

$$\beta=\{X_s/(1-X_s)\}/\{X_p/(1-X_p)\}$$

Where $X_s$ and $X_p$ are number fraction of target in the supernatant and pole regions respectively. The number fractions used in this calculation represent an average from five samples withdrawn from each region. Clearly β must be different from 1 for the separation to be successful.

Results and Discussions

Separation Experiment

Figure 5:
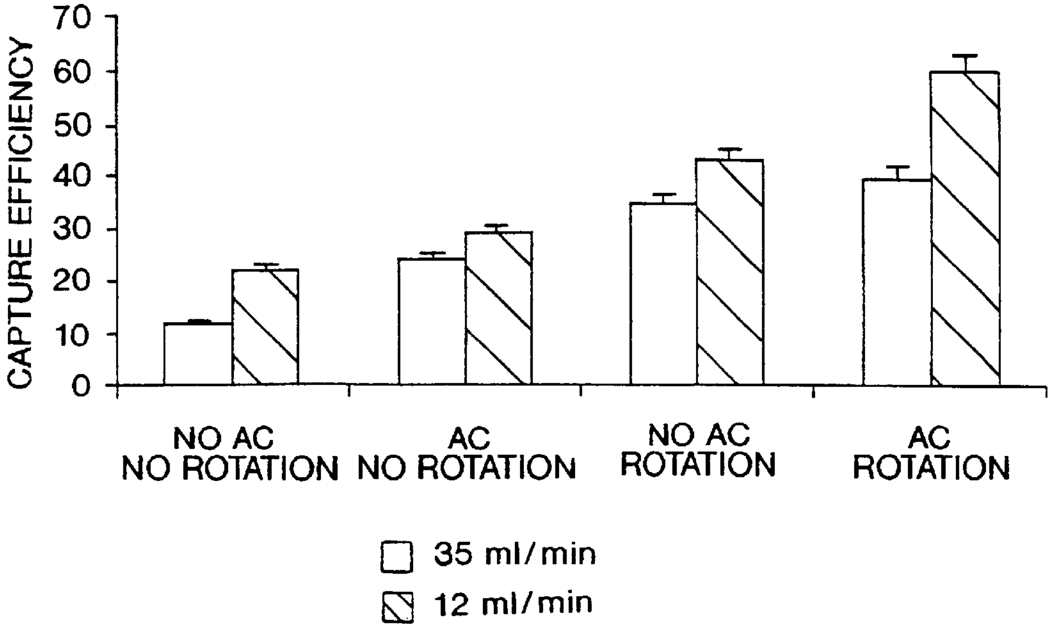
FIG. 5 is a bar graph of the capture efficiencies for two feed flow rates show the effect of the alternating current carrying solenoid and chamber rotation.

Four experiments were performed to confirm that the rotation of the chamber and the alternating current in the solenoid is indeed crucial for the separation. Two feed flow rates were used: 12 ml/min and 35 ml/min, and a total of 600 ml of sample was processed. The results are shown in FIG. 5. Capture efficiency is evaluated from the number of target particles in the feed and supernatant. For experimental conditions probed in these experiments, the first unit was located 40.0 cm downstream from the entrance of the chamber. In experiment with no rotation, nearly all of the magnetic particles sedimented before arriving at the first stage, while most of the target particles exited through the end of the chamber, leading to the extremely low-capture efficiency. A dramatic increase in efficiency is observed when rotation is initiated, clearly pointing to the important consequence of keeping the magnetic particles suspended in solution. Introduction of the alternating current in the solenoid has some additional positive effect with a final capture efficiency 30%.

Figure 6:
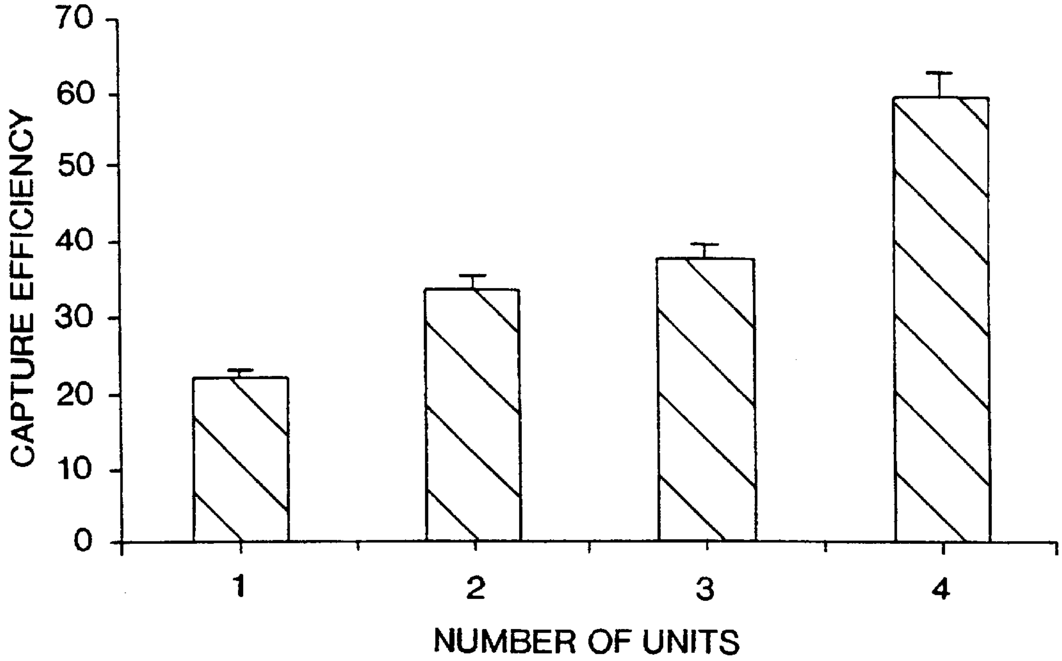
FIG. 6 is a bar graph of the capture efficiencies versus number of units at feed flow rate of 12 ml/min.

FIG. 6 is a graphical representation of the capture efficiency obtained when each repeating unit is sequentially added to the apparatus. One repeating unit gives a separation efficiency of 22%. Each additional unit produced a further separation of the target molecules, up to a level of 60% when all four are in place.

Figure 7:
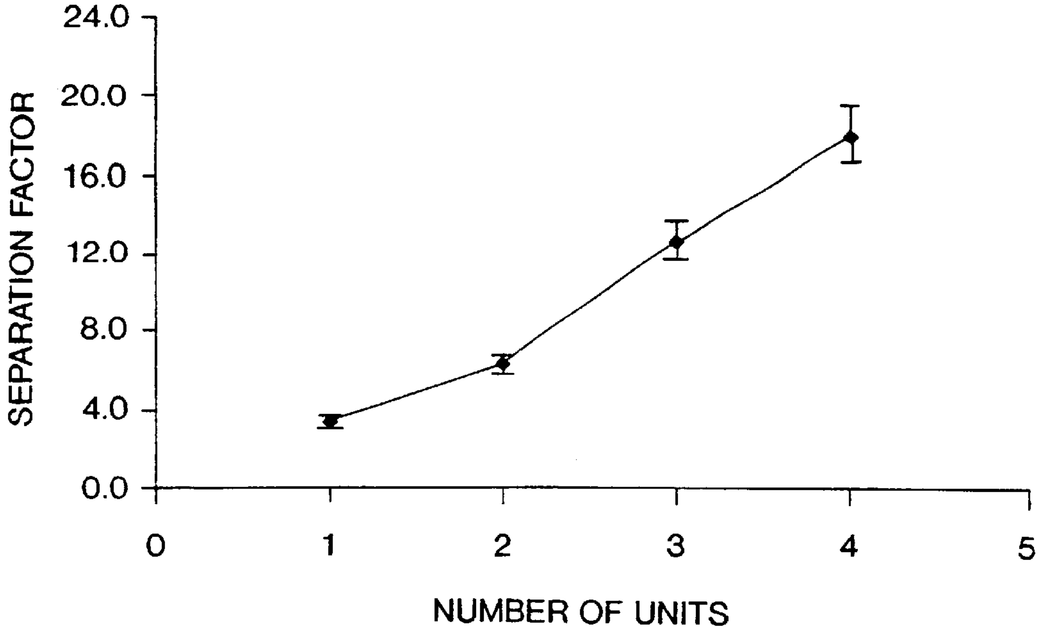
FIG. 7 is a graph of the separation factor versus number of units for feed flow rate of 12 ml/min as each unit sequentially added to the apparatus.

The separation factors β as each of the repeating units is added are shown in FIG. 7. The first unit produces a supernatant with a separation factor ~3.4. With four units, the separation factor rose to ~18. This dramatically high separation factor can clearly be exploited in a multistage unit, each unit consisting of the chamber described here. The separation factor is calculated from the number fraction of targets in the supernatant and pole region.

Figure 8:
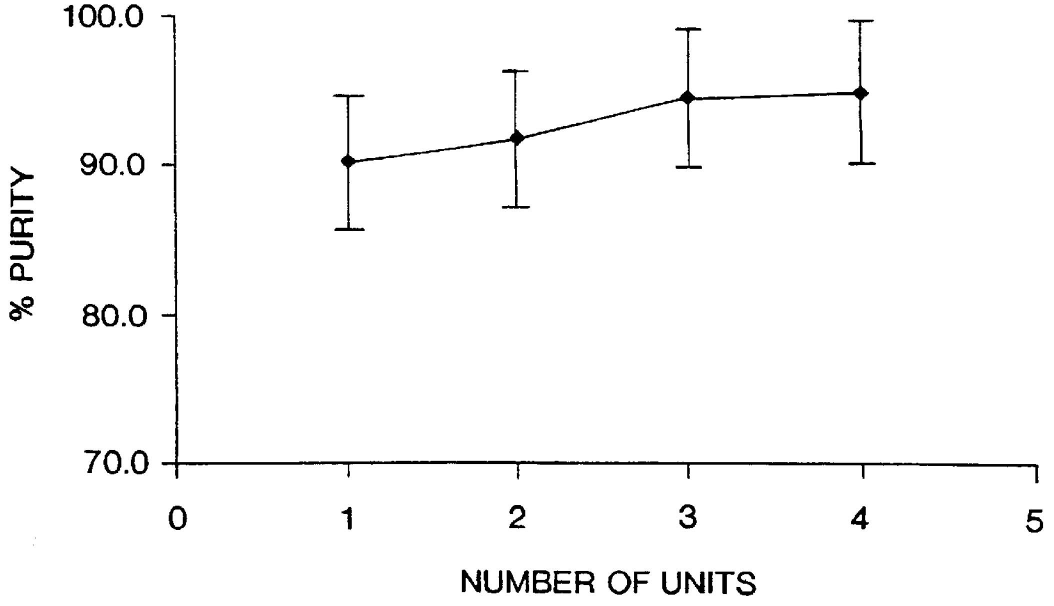
FIG. 8 is a graph of the separation purity versus number of units for feed flow rate of 12 ml/min as each unit sequentially added to the apparatus.

Purity is defined as number concentration of targets divided by the total number concentration of target and non-target. FIG. 8 shows a 95% purity for the system disclosed herein. This result demonstrates the viability of the device for practical applications.

Figure 9:
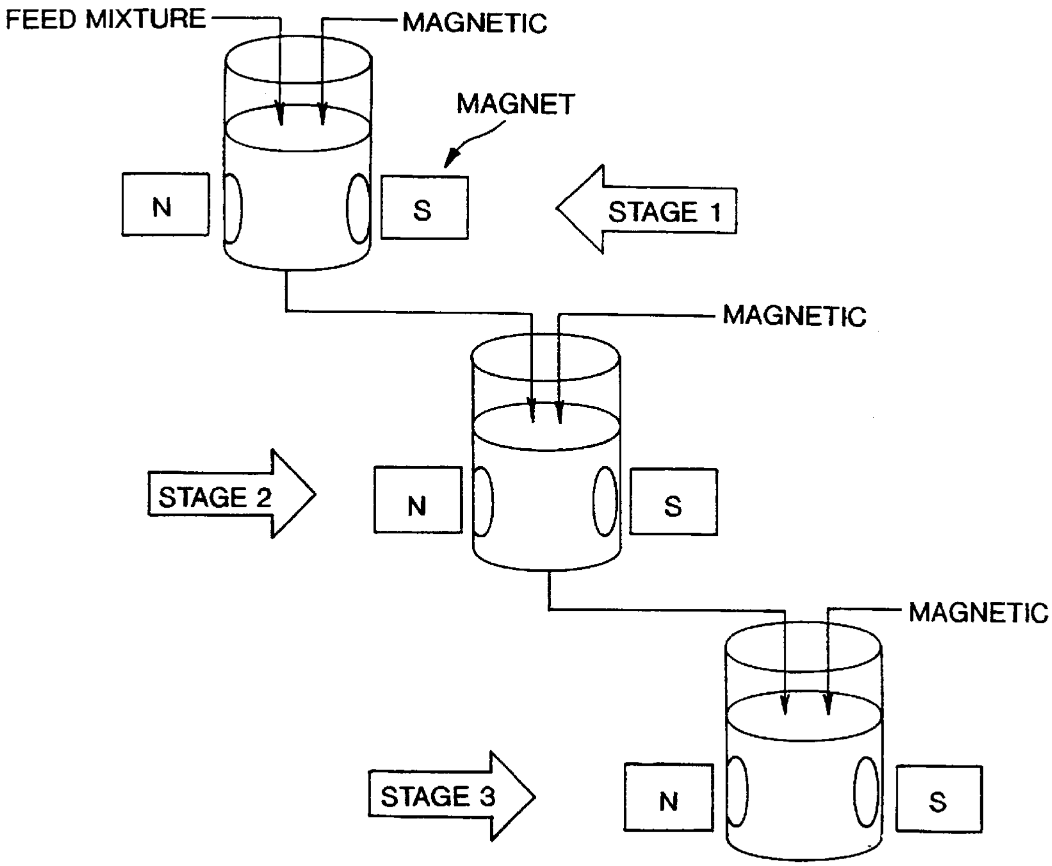
FIG. 9 is an illustration of an arrangement used in the laboratory for applying the magnetic field gradient for multistage batch processing.

An independent experiment for batch process separation was carried out, by placing the target, non-target, and magnetic particles in a test tube. Biotinylated latex beads (1.0 μm diameter) mixed in a 1:1 number ratio with non-functionalized latex beads (9.7 μm diameter) at an overall particle number concentration of ~$6\times10^4$/ml and ~$3\times10^6$ beads/ml number concentration of streptavidin coated magnetic beads (2.8 μm diameter) were used in the experiment. This suspension was shaken continuously for 1 hr, then exposed to the AlNiCo permanent magnets for 45 min, using a multistage arrangement shown in FIG. 9. Placement of a pair magnets near the top of the tube then attracted the magnetized target particles, concentrating them at the poles, while the supernatant region contained the non-target particles. Samples were then withdrawn from both the supernatant as well as the pole region, deposited on the hemocytometer, and target and non-target particles counted.

Figure 10:
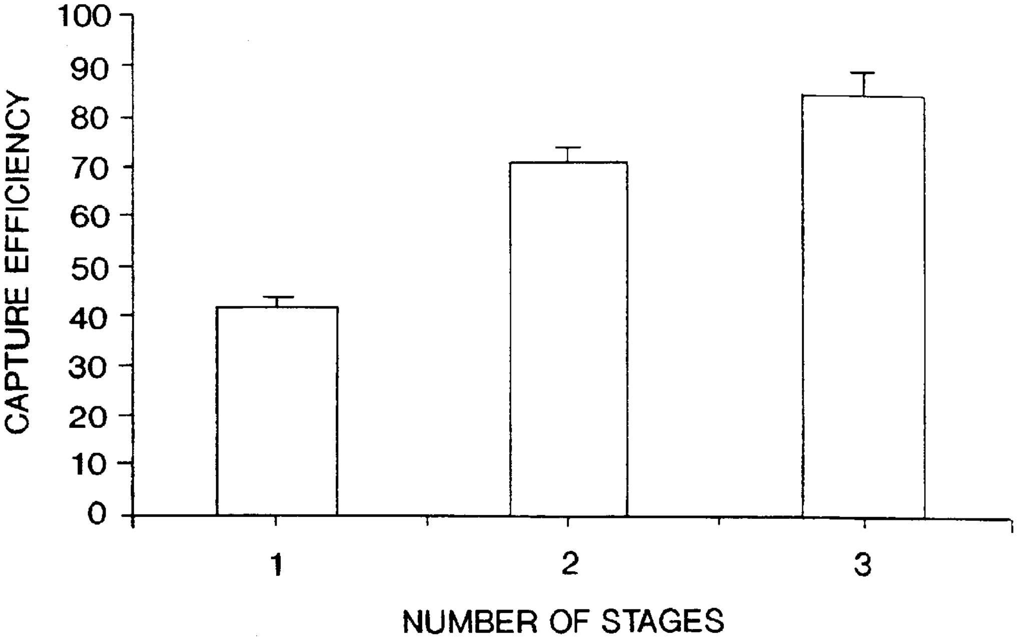
FIG. 10 is a bar graph of the capture efficiencies versus number of stages for the batch process.

FIG. 10 shows the capture efficiencies for a three stage scheme. While the first stage yields approximately 42% efficiency, up to 86% (for three stages) capture efficiency was achieved by sequentially contacting the supernatant from each stage with fresh aliquot of the magnetic particles followed by exposure to magnetic field gradient.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A magnetic affinity separation process which comprises:

introducing a feed stream into a chamber, the feed stream comprising biotinylated target particles;

introducing a surface functionalized magnetic particle into the chamber, said magnetic particles having a binding affinity for the target particles;

subjecting the particles to translational and rotatable oscillations to enhance the mixing of and the contact between the particles to bind the magnetic particles to the target particles and form captured particles;

immobilizing the captured particles on the chamber wall; and recovering the target particles.

2. The method of claim 1 wherein the translational and rotatable oscillations are effected by:

subjecting the particles to an alternating current.

3. The process of claim 1 wherein the translational and rotatable oscillations are effected by:

shaking the chamber.

4. The process of claim 1 which comprises:

effecting relative rotation between the particles and the chamber.

5. The process of claim 1 wherein the bound target particles are immobilized by:

applying a magnetic force to the chamber wall.

6. The method of claim 5 wherein the magnetic force rotates in fixed relationship with the chamber.

7. The method of claim 1 wherein the chamber is tube-like and has an upstream end where the feed stream and magnetic particles are introduced and a downstream end wherein supernatant is removed and the chamber is characterized by successive units and which comprises:

flowing the particles through a first unit, the particles in said first unit subjected to the translational and rotatable oscillations and immobilized on the chamber wall; and flowing the particles through a second successive unit, the particles in said second unit subjected to the translational and rotatable oscillations and immobilized on the chamber wall.

8. The method of claim 1 which comprises:

removing the bound target particles from the chamber wall prior to recovering the target particles.

9. The method of claim 1 wherein the biotinylated target particles are macro molecules.

10. The method of claim 9 wherein the surface functionalized magnetic particles are characterized by surface proteins.

11. The method of claim 9 wherein the surface protein is avidin.

12. The method of claim 9 wherein the surface protein is streptavidin.

13. A magnetic affinity separation device which comprises:

means for introducing a feed stream into a chamber, the feed stream comprising biotinylated target particles;

means for introducing a surface functionalized magnetic particle into the chamber, said magnetic particles having a binding affinity for the target particles;

means for subjecting the particles to translational and rotatable oscillations to enhance the mixing of and the contact between the particles to bind the magnetic particles to the target particles and form captured particles;

means for immobilizing the captured particles on the chamber wall; and means for recovering the target particles.

14. The device of claim 13 wherein means for effecting the translational and rotatable oscillations comprises:

means for subjecting the particles to an alternating current.

15. The device of claim 13 which comprises:

means for effecting relative rotation between the particles and the chamber.

16. The device of claim 13 wherein the means for immobilizing the target particles comprises:

means for applying a magnetic force to the chamber wall.

17. The device of claim 16 which comprises:

means for rotating the magnetic force in fixed relationship with the chamber.

18. The device of claim 13 wherein the chamber is tube-like and comprises:

an upstream end where the feed stream and magnetic particles are introduced and a downstream end wherein supernatant is removed and the chamber comprises:

successive units, which units include:

means for subjecting the particles to the translational and rotatable oscillations; and means for immobilizing the particles on the chamber wall.

19. The device of claim 18 where the means for immobilizing comprises magnets in communication with the units; and the means for subjecting the particles to translational and rotatable oscillations comprises means for applying an alternating current to the units.

20. The device of claim 19 wherein the means for applying an alternating current comprises solenoids.

* * * * *